June 13, 1961 V. EVANS, JR 2,988,609
ACTUATORS
Filed Nov. 4, 1957 4 Sheets-Sheet 1
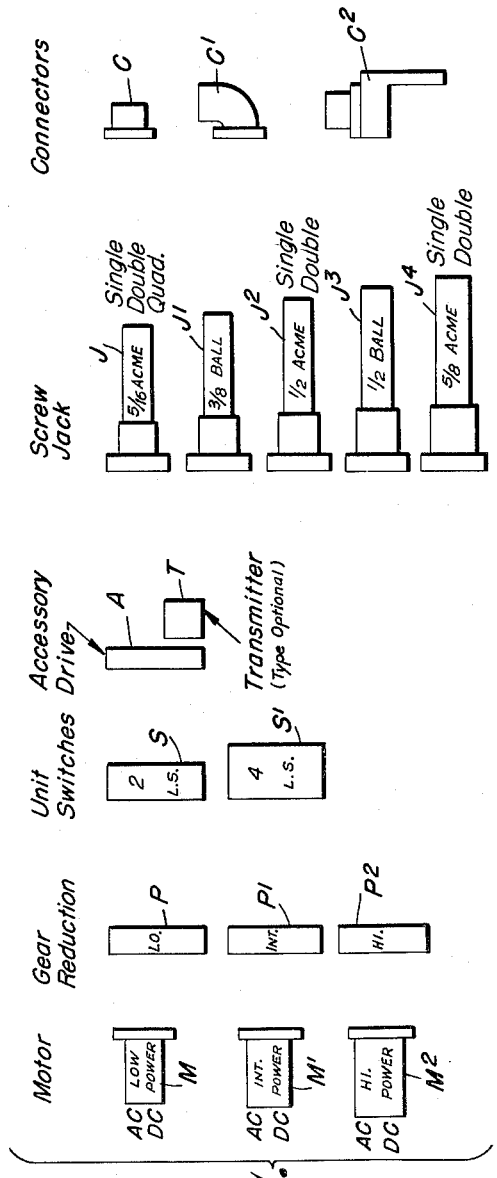
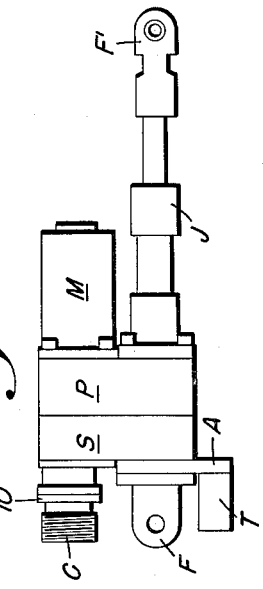
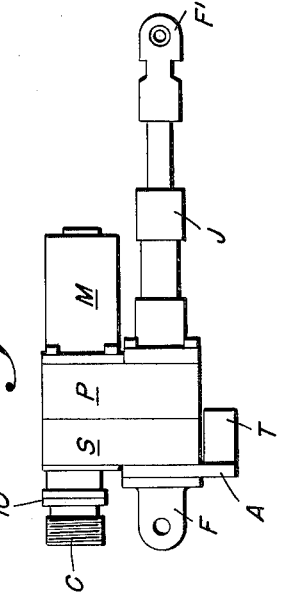
INVENTOR
Vernon Evans, Jr.

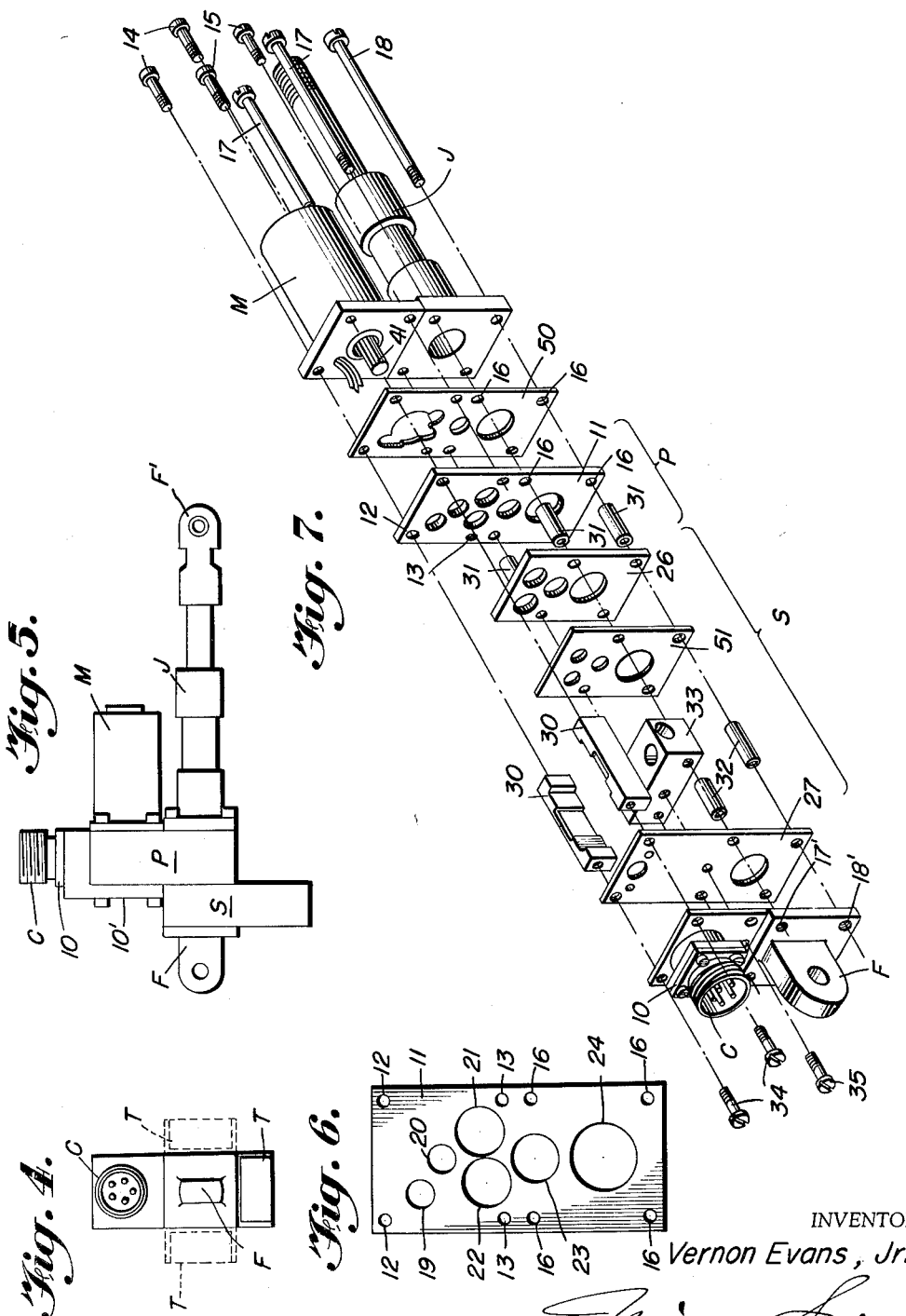

June 13, 1961 V. EVANS, JR 2,988,609
ACTUATORS
Filed Nov. 4, 1957 4 Sheets-Sheet 3

INVENTOR
Vernon Evans, Jr.
BY
ATTORNEYS

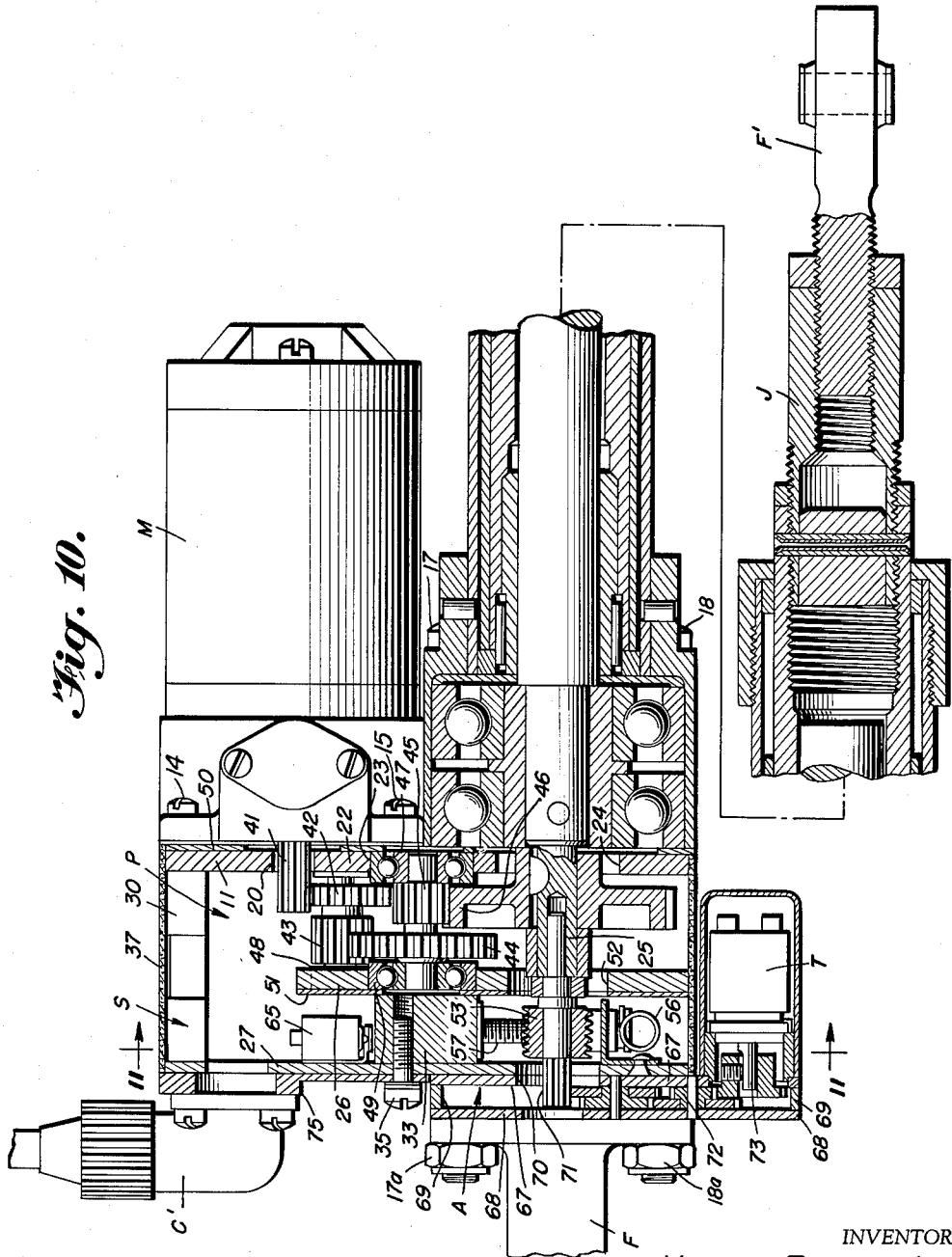

United States Patent Office 2,988,609
Patented June 13, 1961

2,988,609
ACTUATORS
Vernon Evans, Jr., Butler, N.J., assignor to Airborne Accessories Corporation, Hillside, N.J., a corporation of New Jersey
Filed Nov. 4, 1957, Ser. No. 694,439
13 Claims. (Cl. 200—47)

This invention relates in general to actuators and more particularly to electro-mechanical actuators which are remotely controlled to move or extend industrial or aircraft components, such as dampers, valves, doors and the like in the industrial field and aileron, elevator or rudder trim tabs, parachute doors, oil cooler doors, fuel control valves, ram air valves, canopy hoists, and also in connection with ejection seats and the like in the aircraft field.

While the present invention may be applied to rotary actuators, for purpose of convenience, it will be described as applied to linear actuators. In such devices, the actuator usually includes a reversible electric motor which, through a reduction gear train, drives a screw jack to extend or retract the component to be moved. Two or more limit switches are normally used to stop the motor at the desired limits of travel of the aircraft component. Frequently, a synchro transmitter and drive are included in the actuator for obtainment of a signal to indicate movement or control operation of an accessory device.

It has been necessary to supply a large variety of actuators in order to meet varying demands of usage, force, space, configuration and the like. Heretofore, actuators have been produced with the major components separately housed in different casings so that each different actuator required special design to interfit and assemble the different species of motors, screw jacks, gear train or power units and switch units. In the few instances when the power and switch units were housed in the same casing, such casing was formed of bulky cast metal, usually aluminum, and each variation of actuator design required a new design of the housing casting and its support flanges and bearing seats to accommodate the changed design of the power unit gears and switch unit elements.

To obviate these disadvantages of existing actuators, it is a primary objective of the invention to increase the efficiency of production and lessen production costs by provision of means for assembly of a great variety of actuators from standard actuator components, interchangeably and without need for redesign of any one component, including even the actuator housing.

Another objective of the invention lies in the provision of means for producing a range of actuators of different sizes, shapes and capacity and of relatively reduced size and weight without sacrifice of actuator strength or capacity range, thereby permitting better utilization of limited space and odd space configurations in aircraft or other industrial application where space limitation is a factor.

Still another objective of the invention lies in the provision for assembly of a range of differing actuators, whose major parts are encased in a thin housing rather than a heavy cast metal housing, reducing cost and weight while permitting greater flexibility in assembly of the actuator components.

A still further objective of the invention lies in the provision of an actuator which may be readily disassembled and reassembled with different standard components to produce a different actuator at a location remote from original manufacture, as for example, at an aircraft hanger equipped with parts and tools for actuator repair and replacement.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIGURE 1 is a table diagrammatically showing variations in size, shape, and mechanical and electrical characteristics which may appear in standard actuator components as utilized in the invention;

FIGURE 2 is an elevational diagram showing the relation of actuator components when assembled to form one species of an actuator according to the invention;

FIGURE 3 is a diagram similar to FIG. 2 illustrating how the assembly may be varied to change the actuator configuration by changing the transmitter position;

FIGURE 4 is an end view of the actuator shown in FIG. 3 and illustrating two additional optional locations of the transmitter in the actuator assembly;

FIGURE 5 is a diagram similar to FIG. 2 illustrating another species of the actuator in which the switch and power sections are assembled in a relatively different manner;

FIGURE 6 is an elevational view of a standard mounting plate forming one wall of the actuator power section;

FIGURE 7 is an exploded perspective view showing walls, spacers and retaining means of the switch and power section omitting other elements but illustrating the manner of retaining other actuator components assembled to the switch and power sections;

FIGURE 10 is an elevation of an actuator according to the invention with the power, switch, transmitter and transmitter drive components shown in vertical section axially of the screw jack.

Figure 8:
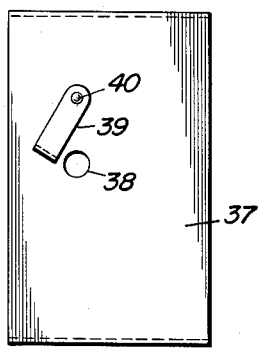
FIGURE 8 is a side elevation of a casing for enclosing the actuator switch and power sections.

Referring more particularly to the drawings, FIGURE 1 diagrammatically portrays a series of standard actuator components which may be selectively assembled in a manner to be described to produce different actuators. At the left, in the first vertical column, are three different motors M, M¹ and M² representing low, intermediate and high power motors, respectively. Each motor is reversible and may be powered by either alternating or direct current. Accordingly, six different motors are represented in the first column of FIGURE 1.

The second column shows three standard power sections or gear reduction units. Unit P represents a low reduction ratio, for example, 60/1. Power unit P¹ represents an intermediate gear reduction ratio, that is, 84.5/1 and unit P² represents a high reduction ratio, for example, 178/1. In the third column of FIG. 1 are shown switch sections S, containing two limit switches, and S¹, containing four limit switches. Additional switches may, of course, be included in other standard sections.

An accessory drive A and a synchro transmitter T are shown in the center of FIG. 1. A variety of transmitters and drives are capable of use as standard components. To the right of these components are shown a series of screw jacks J, J¹, J², J³ and J⁴ which may be of conventional manufacture varying in size from ¼ inch to one inch. Each screw jack may be single or double threaded and certain ones quadruple threaded. In the last column of FIG. 1 are illustrated three variations of electrical motor and transmitter connectors C, C¹ and C². Other standard connectors may be used.

The described components, being interchangeable in the actuator construction according to the invention, may be assembled in hundreds of variations to yield linear actuators of any desired horsepower, operating capacity and package configuration. In practice, the components are grouped in three broad operating capacity classifications. All components within a given classification are interchangeable. In one classification, there are 22 standard major components. Over 100 different linear actuators, ranging from 350 to 1,500 lbs. maximum operating capacity, can be assembled from these 22 components.

The manner in which different configurations of assembled actuators are obtained is illustrated in FIGS. 2–5. A rectangular power section or module P and a similarly shaped switch section or module S are assembled side to side. The motor M and screw jack J are assembled to the outer side of the power section. The screw jack is terminated at its outer end by the movable fitting F¹ which will be attached to the aircraft part to be extended. To the outer side of the switch module S is assembled the connector C and the accessory drive A. The transmitter T is attached to the downwardly extending portion of drive A so as to lie under module S. The fixed fitting F is attached to the outer side of drive A for ultimate securement to a fixed part of the aircraft.

It will be understood that different components or modules, such as M¹, P², S¹, C² and J³, may be selected for assembly in the same configuration as shown in FIG. 2 to produce different actuators of the same general shape. To accomplish this purpose, each component to be assembled to the switch or power modules is provided with a standard mounting base 10 or a mounting adaptor having openings for retaining screws in fixed locations. This feature is exemplified by connector C, FIG. 5, in which the tubular, pin containing collar on standard base 10 extends upwardly from the power module being fastended to the upper surface of a right angled mounting adaptor 10′.

FIGURE 5 also illustrates how the configuration of the actuator may be modified by omission of the transmitter and accessory drive and turning the switch section 180° while lowering it to extend below power section P. Further changes in actuator configuration may be obtained by mounting the transmitter T on the outer surface of drive A instead of the inner surface as shown in FIG. 3. FIGURE 4 illustrates in dotted outline two additional optional locations of the transmitter T if space configurations make such locations desirable.

FIGURE 6 illustrates a typical construction of one side wall 11 of the power section or module which enables assembly thereto of standard actuator components, as well as support of the power section elements. Wall 11 is a relatively thin flat plate, preferably of rectangular shape, pierced by a plurality of openings. Openings 12 and 13 permit the passage of motor retaining screws 14 and 15, see FIG. 7, holes 13 being threaded for coaction with the threads of screws 15. Openings 16 permit the passage of screw jack retaining bolts 17 and 18. Opening 19 permits passage of conductors leading from the motor M to connector C. Opening 20 permits passage of the motor drive shaft and is large enough to take any of the selectable motor components. Openings 21, 22 and 23, of different size, are adapted to receive bearings comprising parts of the gear reduction train in the power section.

Not all of these openings need be used in the assembly of a given actuator, and similarly, additional and extra openings may be provided to accommodate standard mounting bases for the motor and screw jack. Opening 24 freely permits ingress of the screw jack driven shaft 25 into the power section. The other power section wall 26, switch section wall 27 and accessory drive walls 67 and 68 are similarly formed as flat plates pierced by openings.

It will be readily understood, however, without further illustration, that the plates and openings may differ in size and in the number, shape, positioning and size of the openings to accommodate variations in the elements to be supported.

FIGURE 7 diagrammatically illustrates how the power and switch modules may be assembled to each other and to other major actuator components. For sake of clarity, the elements of the power and switch sections other than walls, spacers and retaining means have been omitted. The second or inner wall 26 of the power section P is shorter than wall 11 to allow elements of the switch section such as a filter or capacitor, not shown, to be supported from two spacer bars 30 at the upper end of the power section above the gear train located therein. Walls 11 and 26 are maintained in parallel relation by four tubular spacer collars 31, preferably formed of metal. These collars are of equal length and may be varied in length to accommodate different gear trains which may be selected for use in a particular power section. Outer wall 27 of the switch section S is held parallel to walls 11 and 26 by a pair of spacer collars 32, the spacer bars 30 and a rectangular element 33 of the switch assembly, which also acts as a spacer of appropriate length.

When the actuator to be assembled includes a greater number of switches, as for example, four or six rather than two, the distance between walls 27 and 51 must be increased. In such case, different spacers of increased length are substituted for spacers 30 and 32. One pair of motor retaining screws 14 passes through openings in the motor base and plate 11, and is secured in threaded openings in spacers 30. A second pair of motor retaining screws 15 is secured in threaded openings 13 of wall 11. A pair of retainer screws 17 pass successively through openings in the screw jack mount, openings 16 in wall 11, spacer collars 31, openings in wall 26, spacer 33, wall 27 and is secured in threaded openings 17′ in the fitting F, FIG. 7, or by nuts 17a, FIG. 10, where high strength is required. Another pair of screws 18 pass through the screw jack mount, collars 31, wall 26, collars 32, wall 27 and is secured in threaded openings 18′ in the mount of fitting F, FIG. 2, or nuts 18a, FIG. 10. A pair of screws 34 serve to assemble connector C to wall 27 by passage therethrough and securement to spacers 30. A third screw 35 assists in performing the same function but is secured in a threaded opening in spacer 33.

Figure 9:
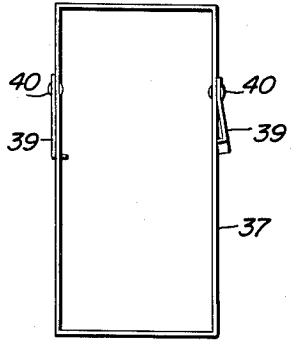
FIGURE 9 is an end view of the casing shown in FIG. 8.

The described construction of walls, spacers, actuator components and retaining means provides a strong, rigid assembly well able to resist the compressive, tensional and torsional strains of actuator operation without the need for imparting additional strength. Therefore, a thin tubular housing 37 (FIGS. 8 and 9), preferably of light weight fiber and having a rectangular cross section equal to that of walls 11 and 27, is provided to slide over these walls after assembly of the switch and power sections to close the four open sides thereof and prevent ingress of dust, dirt or other foreign matter. An access hole 38 is provided in each of two opposite walls to permit adjustment of the limit switch operations. Holes 38 are normally closed by members 39 which are swingably attached to the wall by rivets 40 about which they pivot.

Figure 11:
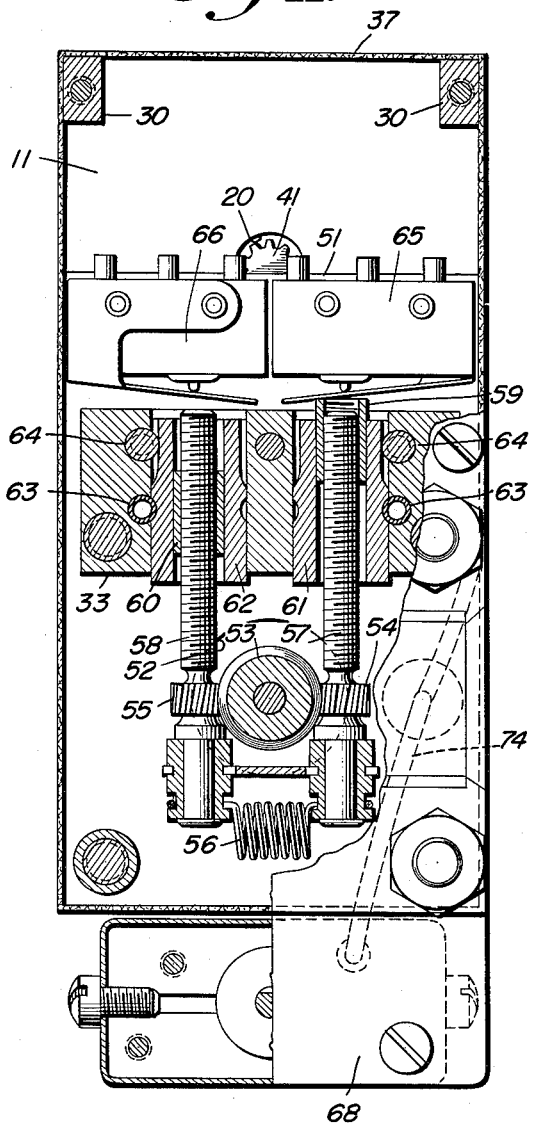
FIGURE 11 is a section taken on line 11—11 of FIG. 10 and looking in the direction of the arrows, certain parts being shown in elevation.

FIGS. 10 and 11 illustrate the construction of an assembled modified actuator having a transmitter and accessory drive, and show the relationship of parts in the power and switch sections to each other and to the transmitter. The reversible motor shaft 41 is provided with spur gear teeth and drives a train of reduction gears 42, 43, 44, 45 and 46, the last being keyed to screw jack shaft 25. The screw jack J is of conventional design and will not be described. The gear axles ride in bearings such as 47, 48 and 49 which are received in openings in walls 11 and 26, as previously described. Preferably, a pair of shim or cover plates 50 and 51 are placed each outside and adjacent to one of walls 11 and 26. Plates 50 and 51 are also pierced by openings corresponding to those in the walls they cover, but the openings corresponding to those which seat bearings are made smaller in diameter so as to hold the bearings in the openings in walls 11 and 26. Other holes in cover plates 50 and 51 may differ in configuration from the corresponding openings in walls 11 and 26 to suit the needs for complete or partial closure of openings on assembly of different major actuator components. It will be understood that in certain instances the mounting bases of actuator components or elements of the switch section may cover and retain bearings in the openings of walls 11 and 26. In such instances, one or both of plates 50 and 51 may be omitted.

Screw jack shaft 25 passes through opening 52 of wall 26 into the switch section S. A worm gear 53 keyed to shaft 25 drives gears 54 or 55 upon extension or retraction respectively of the screw jack J. Coil spring 56 biases gears 54 and 55 toward each other and into positive, no play, engagement with gear 53 as it reverses. Gears 54 and 55 are keyed to threaded shafts 57 and 58 respectively which are in threaded engagement with switch actuating sleeves 59 and 60, respectively. Sleeves 59 and 60, therefore, are movable up and down in adjusting collars 61 and 62 by reason of tongue and groove engagement therewith. Collars 61 and 62 are rotatively held in spacer support 33, previously described, by means of pins 63. Adjust screws 64 threadedly engage collars 61 and 62 to turn them, thereby raising or lowering actuating sleeves 59 and 60 slightly as needed to adjust operation of the microswitches 65 and 66 at the proper limits of movement of the screw jack. The limit switches 65 and 66 and shaft assembly 57, 58 are suitably supported from wall 27 in any desired manner, brackets riveted to wall 27 being indicated in FIG. 10.

The accessory drive A (FIG. 10) is constructed similar to power section P being comprised of two flat walls 67 and 68 which are pierced with necessary openings and are rectangular in shape. A rectangular tubular spacer member 69 separates the walls and doubles as a casing member to close the opening between walls 67 and 68. Screw jack shaft 25 extends through opening 70 into the drive section being terminated in a gear end 71 which drives the gear train generally indicated at 72 to rotate shaft 73 of transmitter T in proportion to movement of the screw jack. Electrical conductors leading from the transmitter to connector C¹ through modules A and S are partially shown at 74, FIG. 11. The conductors carry a signal which serves to indicate movement of the screw jack or to correspondingly control movement of another device. Other electrical conductors, not shown, pass from connector C¹ to motor M through modules S and P. Fitting F is attached to wall 68. Connector C1 is attached to wall 27 by means of a mount adaptor 75 and retaining screws.

It will be apparent from the foregoing description that a large variety of actuators may be quickly and efficiently assembled from standard components. The assembly may be readily accomplished in several ways. It can start with fitting F at the left of FIG. 10 and progress part by part toward the right until completion by attachment of the screw jack J and fitting F¹. Alternatively, it may be started at the right with the screw jack and motor and progress part by part toward the left. Still other procedures are possible, the construction being such that any one of sections A, S and P may be assembled separately, then to each other, and the fittings, motor and screw jack added last. The casing 37 may be slipped over the power and switch sections at any time before or after attachment of the motor and screw jack.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, replaceable means for spacing said inner and outer wall and means for retaining said walls in parallel relation.

2. In an actuator, a modular assembly as described in claim 1 wherein said inner and outer walls of the switch and power sections are each provided with a plurality of openings therethrough which permit passage of co-operating members of other components of said actuator such as a motor, a screw jack, an electrical connector and the like, said openings in said outer walls being arranged to be covered by the assembly to such walls of said other components, and said openings in said outer walls being so shaped, sized and positioned as to permit assembly to said switch and power sections of a variety of each of said other components.

3. In an actuator, a modular assembly as described in claim 1 wherein said inner and outer walls of the switch and power sections are provided with a plurality of component fastening openings receiving retaining means for assembling other components of said actuator such as a motor, a screw jack, an electrical connector, a transmitter, a transmitter drive and the like.

4. In an actuator, a modular assembly as described in claim 1 wherein said inner and outer walls of the switch and power sections are provided with aligned openings permitting passage of the driven shaft of a screw jack component, said openings being of such size as to permit substitution in the actuator assembly of different screw jacks of varying types and sizes.

5. A modular actuator assembly, comprising a power unit, sandwiched between a pair of flat parallel walls, means for detachably mounting one of a number of different types of switch units thereon, each switch unit comprising elements sandwiched between and secured directly to one of said walls and a third parallel flat wall, a switch unit so mounted, means for detachably mounting one of a number of different types of motor units on said power unit, each said motor unit comprising a standard flat mounting base, a motor unit so mounted for operative association with said power unit, means for detachably mounting one of a number of different types of screw jacks on said power unit, each said screw jack comprising a standard flat mounting base, a screw jack so mounted in operative association with said power unit, and means in synchronism with said jack for operating said switch unit to control said jack.

6. The assembly of claim 5, comprising means for detachably mounting one of a number of different types of accessory drive units on said assembly, each said accessory drive units comprising a standard flat mounting base, an accessory drive unit so mounted and driven by said power unit, means for detachably mounting one of a number of different types of transmitters on said accessory drive unit, each said transmitters comprising a standard flat mounting base, and a transmitter so mounted and driven by said accessory drive unit so that the transmitter is driven in proportion to the movement of the screw jack.

7. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, means for spacing said inner and outer walls, means for retaining said walls in parallel relation, and a thin walled tubular casing open at two ends and slidable over said switch and power sections to close the open sides thereof between the said section outer walls.

8. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, variable means for spacing said inner and outer walls whereby the power section may be varied to accommodate different sets of reduction gear trains, and means for retaining said walls in parallel relation.

9. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, means for spacing said inner and outer walls, means for retaining said walls in parallel relation, and a set of openings provided in each of said outer walls of the switch and power section for receiving retaining means for assembly to said wall of other actuator components each having a standard base whereby said sets of openings permit assembly of components each of which may vary in size, shape and electrical characteristics.

10. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, means for spacing said inner and outer walls, and means for retaining said walls in parallel relation, said wall retaining means including a plurality of bolts certain of which pass completely through said assembly from outer wall to outer wall and additionally serve to secure other actuator components to said modular assembly.

11. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, means for spacing said inner and outer walls, means for retaining said walls in parallel relation, said outer wall of said power section being provided with a plurality of openings therethrough, bearings of a gear train received in said outer and inner wall openings, and an additional pair of thin plates juxtaposed with said power section outer and inner walls against the outside surfaces thereof and having corresponding openings of smaller diameter positioned to retain said bearings in said openings, said means for retaining the assembly walls in parallel relation serving also to secure said additional pair of thin plates.

12. In an actuator for converting electrical energy to mechanical motion, a modular assembly comprising a switch section and a power section, each of said sections having a flat outer wall and a flat inner wall common to both sections, said flat inner wall having a plurality of openings therethrough for passage of shafts and reception of gear bearings, said openings being so shaped, sized and arranged as to permit assembly of a variety of switch sections and a variety of power sections, means for spacing said inner and outer walls, and means for retaining said walls in parallel relation, said switch section including a plurality of switches, a plurality of gears for driving actuation of said switches independently meshing with a drive gear on a jack screw shaft extending through said power section into said switch section, and biasing means urging said plurality of gears into meshing engagement with said drive gear.

13. The method of constructing an actuator which comprises selecting a set of components to be assembled from motor, screw jack, connector, transmitter and other components each in different sizes, shapes and mechanical and electrical characteristics, and each component having a standard size, flat, mounting base providing a power section having gear train elements assembled between two flat plates and supported therefrom, assembling switch elements directly to and between one of said plates and a third flat plate, providing openings in said plates for passage of connecting elements of said components, and affixing the selected ones of said set of components to the outer surfaces of the other plate of said power section and said third plate.

References Cited in the file of this patent

UNITED STATES PATENTS

| | | |
|---|---|---|
| 2,466,426 | Hoover | Apr. 5, 1949 |
| 2,839,623 | Stolle | June 17, 1958 |